United States Patent [19]
Hayter et al.

[11] Patent Number: 5,404,354
[45] Date of Patent: Apr. 4, 1995

[54] ATM SIGNAL PROCESSORS

[75] Inventors: Andrew T. Hayter, Bitterne Park; Simon P. Davis, Romsey; Ian B. Stewart, North Baddesley, all of England; Thomas Worster, Munich; Wolfgang Fischer, Germersing, both of Germany

[73] Assignee: Roke Manor Research Limited, Hampshire, England

[21] Appl. No.: 118,224

[22] Filed: Sep. 9, 1993

[30] Foreign Application Priority Data

Nov. 6, 1992 [GB] United Kingdom ................. 9223254

[51] Int. Cl.$^6$ .............................................. H04J 3/24
[52] U.S. Cl. ................................... 370/94.1; 370/94.2
[58] Field of Search ................... 370/58.1, 58.2, 58.3, 370/60, 60.1, 61, 85.6, 94.1, 94.2, 110.1, 112

[56] References Cited

U.S. PATENT DOCUMENTS

| | | | |
|---|---|---|---|
| 4,769,811 | 9/1988 | Eckberg, Jr. et al. | 370/60 |
| 4,849,968 | 7/1989 | Turner | 370/60 |
| 5,166,930 | 11/1992 | Braff et al. | 370/94.1 |
| 5,179,557 | 1/1993 | Kudo | 370/94.1 |
| 5,233,606 | 8/1993 | Pashan et al. | 370/85.6 |
| 5,267,232 | 11/1993 | Katsube et al. | 370/94.1 |

OTHER PUBLICATIONS

1990 IEEE-AT&T Bell Laboratories, C. R. Kalmanek et al; "Rate Controlled Servers for Very High-Speed Networks", pp. 300.3.1-300.3.9.
IEEE 1991 Custom Integrated Circuits Conference-"A 0.8-m BiCMOS Sea-Of-Gates Implementation of the Tandem Banyan Fast Packet Switch", Fabio M. Chiussi et al, pp. 3.3.1-3.3.6.
IEEE Global Telecommunications Conference-Dec. 6-9, 1992; "A High-Performance Prototype 2.5 Gb/s ATM Switch for Broadcast Applications", K. Y. Eng et al-pp. 111-115.
IEEE Global Telecommunications Conference; Dec. 6-9, 1992 "Datagram Switching Networks for Broadband Data Communications", M. Decina et al-pp. 104-110.

Primary Examiner—Alpus Hsu
Attorney, Agent, or Firm—Hill, Steadman & Simpson

[57] ABSTRACT

An ATM signal processor system for processing ATM data cells which in combination define a data package wherein the last cell of a package is characterized by an identifying code. The cells of different data packages are multiplexed to provide a serial data stream. A server and a buffer store via which the server is fed with the serial data stream are provided. The buffer store has a threshold capacity beyond which cells are discarded. A discarded cell identifier/rejecter serves to identify and store the identity of a data package with which a discarded cell is associated so as to be set thereafter to reject subsequently received cells with the same data package identity until being reset upon receipt of the last cell of the package as indicated by its characteristic identifying code.

3 Claims, 2 Drawing Sheets

ATM SIGNAL PROCESSORS

BACKGROUND OF THE INVENTION

This invention relates to asynchronous transfer mode (ATM) signal processor systems and more especially it relates to such systems for ATM data transmission wherein the transmission comprises a number of cells which are transmitted successively and which in combination define a data package or frame wherein the last cell of the package is characterized by an identifying data code.

When a plurality of transmissions are made each relating to a different data package, the cells of the various transmissions are multiplexed or interleaved to provide a serial data stream. It will be appreciated that ATM data traffic is inherently bursty in nature, and in order to accommodate widely varying data rates arriving at a server, a serial buffer store is normally provided via which the server is fed with the serial data stream. Since in times of heavy traffic the capacity of the buffer store may be inadequate, the buffer store is arranged to have an in-built threshold capacity beyond which data is discarded and lost whereby re-transmission is required.

It will be appreciated that when a cell is discarded, the data package of which it forms a part is corrupted such that subsequently transmitted cells which form part of the same data package are useless. As the buffer store empties, however, useless subsequently received cells relating to the corrupted data package may nevertheless be stored in the buffer so as to occupy buffer storage capacity which might be more fruitfully used. Thus, data transmission efficiency is reduced.

SUMMARY OF THE INVENTION

It is an object of the present invention to provide an ATM signal processor system wherein the cells of data packages corrupted as aforesaid are not needlessly stored, so that system efficiency is improved.

According to the present invention, an ATM signal processor system is provided for processing ATM data cells which in combination define a data package wherein the last cell of a package is characterized by an identifying code. A means is provided for multiplexing the cells of different data packages to thereby provide a serial data stream. A server and a buffer store via which the server is fed with the serial data stream is provided. The buffer store has a threshold capacity beyond which cells are discarded. A discarded cell identifier/rejecter means serves to identify and store the identity of a data package with which a discarded cell is associated, so as to be set thereafter to reject subsequently received cells with the same data package identity until being reset upon receipt of the last cell of the package as indicated by its characteristic identifying code.

The discarded cell identifier/rejecter may comprise address register means in which the address of discarded cells is stored and an inhibitor means responsive to the address of subsequently received cells for deleting them if their address corresponds to an address in the register. An address is deleted from the register upon reception of a cell having that address and additionally identified as a last cell in a data package; by its characteristic identifying code.

The address register means may comprise a mask register.

An embodiment of the invention will now be described by way of example only with reference to the accompanying drawing.

DESCRIPTION OF THE PREFERRED EMBODIMENTS

Figure 1:
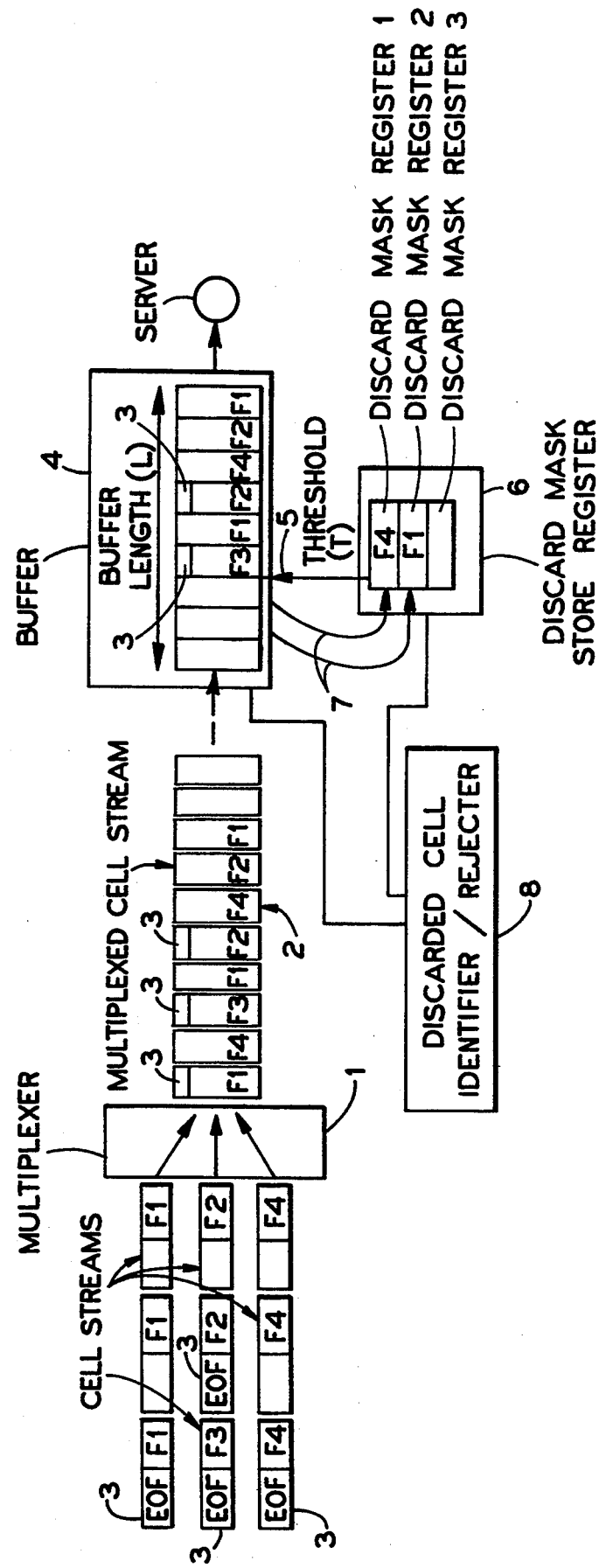
FIG. 1 is a diagram illustrating an ATM signal processor system according to the invention.

Referring now to the drawing, cell streams relating data packages F1, F2, F3, and F4 are fed through a multiplexer 1 to provide a serial data stream 2. Each data package may comprise a number of cells, the final cell only of which is identified as such by a characteristic code final cell 3, as shown schematically in FIG. 1.

Figure 2:
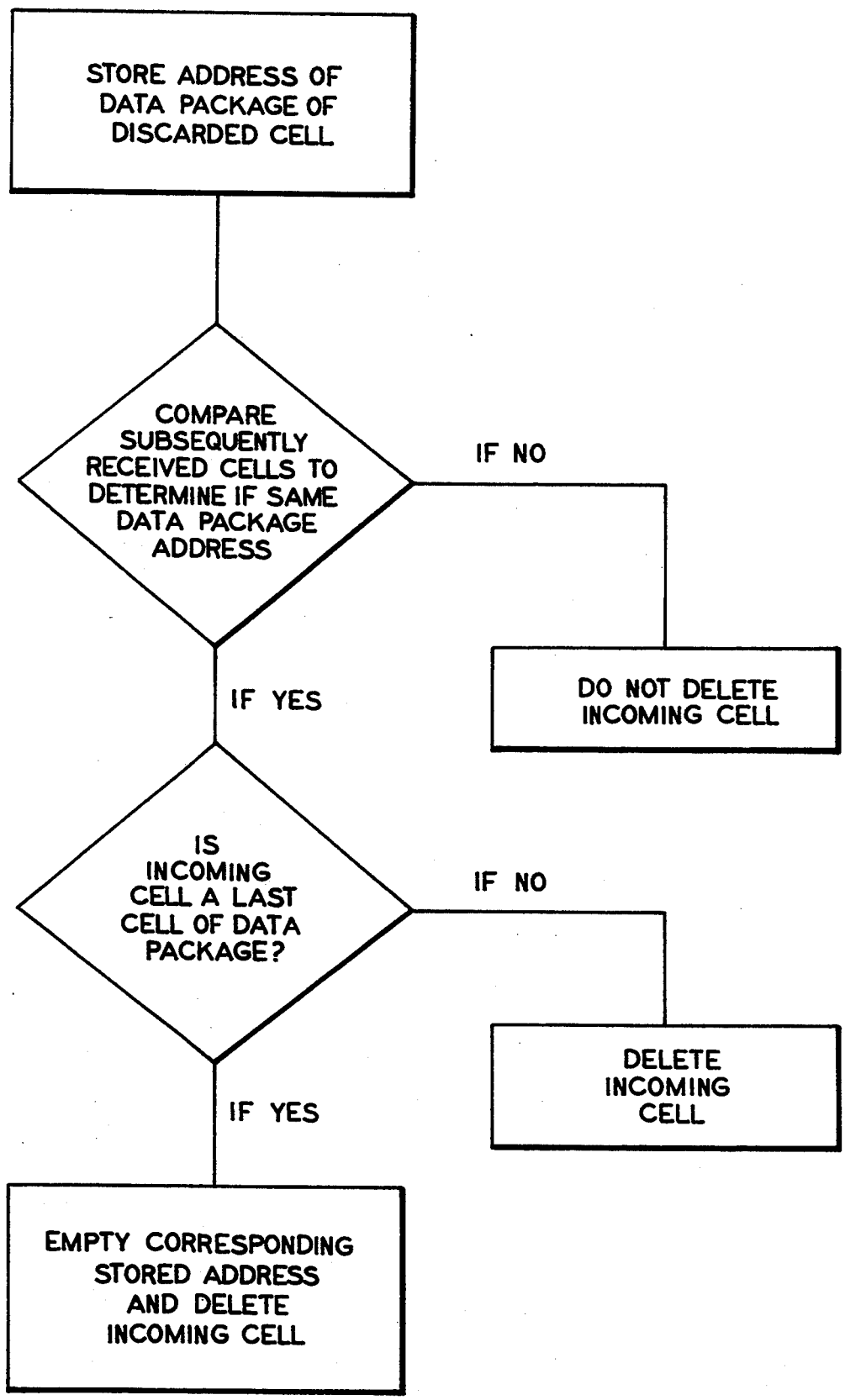
FIG. 2 is a flow diagram for showing operation of the discarded cell identifier/rejecter of the invention.

The multiplexed serial cell stream is fed to a buffer 4 including a threshold capacity 5 beyond which cells are discarded. The addresses of discarded cells are stored by control of a discarded cell identifier/rejecter 8 in a discard mask store register 6 which comprises a plurality of mask address stores for storing addresses corresponding to a number of different cells. When the address of a discarded cell has been stored, subsequently received cells are examined by the indentifier/rejecter and details of their address are fed over the lines 7 to the discard mask store register 6. The discarded cell identifier/rejecter 8 performs the following functions, as illustrated by the flow chart in FIG. 2. If correspondence results between the address of an incoming cell and an address stored therein, that incoming cell is deleted. In the event that a cell arrives having an address which corresponds to one of the addresses stored in the register 6 and additionally is identified by a characteristic code as a last cell 3 of a data package, then the discard mask address store corresponding thereto is emptied so as to be available to receive the address of a newly discarded cell.

It will be appreciated that once a cell has been deleted due to buffer overflow, when the threshold has been reached (which is the most common cause of cell loss), the rest of the cells which form part of the same frame or data package will also be deleted without increasing frame loss, whereby optimum use of the buffer store for desired cells is facilitated. Thus, by deleting all cells making up a particular frame in conditions of high buffer usage, the continuing deletion of specific cells making up a frame, even after the buffer usage has dropped below threshold T, will reduce the chance of other frames being deleted.

Various modifications may be made to the arrangements shown without departing from the scope of the invention, and, for example, any suitable address identifying/storage/discard means may be used, as will be well known to those skilled in the art.

We claim as our invention:

1. An Asynchronous Transfer Mode (ATM) signal processor system for processing ATM data cells which in combination define data packages, and wherein a last cell of the data packages has an identifying code, comprising:
a multiplexer for multiplexing the cells of different data packages to provide a serial data stream;
a server;

a buffer store via which the server is fed with said serial data stream, said buffer store having a threshold capacity beyond which cells are discarded;

a discard store register; and a discarded cell identifier/rejecter for serving to identify and store in said discard store register identity of a data package with which a discarded cell is associated so that the identifier/rejecter thereafter rejects subsequently received cells with the same data package identity until the discard store register is reset upon receipt of a last cell of said data package with which said discarded cell is associated as indicated by its characteristic identifying code.

2. A system according to claim 1 wherein the discard store register stores addresses of discarded cells, and said discarded cell identifier/rejecter is responsive to addresses of subsequently received cells for deleting them if their address corresponds to an address in said discard store register, an address being deleted from the discard store register upon reception of a cell having that address and additionally being identified as a last cell in a data package by its characteristic identifying code.

3. A method for processing Asynchronous Transfer Mode (ATM) ATM data cells which in combination define data packages, and wherein a last cell of the data packages has an identifying code, comprising the steps of:

multiplexing the cells of different data packages to provide a serial data stream;

providing a server;

feeding the serial data stream to a buffer store via which the server is fed with said serial data stream, said buffer store having a threshold capacity beyond which cells are discarded;

providing a discard store register; and identifying and storing in the discard store register identity of a data package with which a discarded cell is associated, and thereafter rejecting subsequently received cells with the same data package identity until the discard store register is reset upon receipt of a last cell of said data package with which said discarded cell is associated as indicated by its characteristic identifying code.

* * * * *